US008270326B2

United States Patent
Kim (10) Patent No.: US 8,270,326 B2
(45) Date of Patent: Sep. 18, 2012

(54) OPERATING MODE TRANSITION METHOD AND CONTROL APPARATUS FOR POWER SAVING OF MOBILE STATION

(75) Inventor: Jong Yol Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 967 days.

(21) Appl. No.: 11/877,140

(22) Filed: Oct. 23, 2007

(65) Prior Publication Data

US 2008/0095092 A1    Apr. 24, 2008

(30) Foreign Application Priority Data

Oct. 24, 2006 (KR) .............................. 2006-0103260

(51) Int. Cl.
*H04W 4/00* (2009.01)
*H04W 68/00* (2009.01)
*G08C 17/00* (2006.01)

(52) U.S. Cl. ......... 370/311; 370/329; 370/390; 455/458

(58) Field of Classification Search ................... 370/311, 370/312, 318, 328, 329, 390, 352, 351, 389, 370/400; 455/435.1, 574, 522, 436, 444, 455/441

See application file for complete search history.

(56) References Cited

U.S. PATENT DOCUMENTS

| 7,693,555 B2 * | 4/2010 | Srinivasan et al. ............ 455/574 |
| 7,778,640 B2 * | 8/2010 | Cho et al. .................... 455/435.1 |
| 2006/0025134 A1 * | 2/2006 | Cho et al. .................... 455/435.1 |
| 2006/0099950 A1 * | 5/2006 | Klein et al. .................... 455/439 |
| 2006/0160558 A1 * | 7/2006 | Kim et al. ..................... 455/522 |
| 2006/0240832 A1 * | 10/2006 | Kim et al. ..................... 455/438 |
| 2008/0020808 A1 * | 1/2008 | Wang et al. ................... 455/574 |

FOREIGN PATENT DOCUMENTS

| KR | 10 1999-026609 | 4/1999 |
| KR | 1020010021100 | 3/2001 |
| KR | 1020010103975 | 11/2001 |
| KR | 1020050058874 | 6/2005 |
| KR | 1020060084330 | 7/2006 |
| WO | WO 96/11556 | 4/1996 |

* cited by examiner

*Primary Examiner* — Hanh Nguyen
(74) *Attorney, Agent, or Firm* — The Farrell Law Firm, P.C.

(57) ABSTRACT

An operating mode transition method and control apparatus for power saving of a mobile station in a wireless communication environment are disclosed. The operating mode transition method includes receiving, in an idle mode, a control message having an indication of ranging from a corresponding base station, transitioning to a sleep mode, upon reception of the control message, and performing a ranging procedure in the sleep mode.

10 Claims, 5 Drawing Sheets

OPERATING MODE TRANSITION METHOD AND CONTROL APPARATUS FOR POWER SAVING OF MOBILE STATION

PRIORITY

This application claims priority to an application entitled "OPERATING MODE TRANSITION METHOD AND CONTROL APPARATUS FOR POWER SAVING OF MOBILE STATION" filed in the Korean Intellectual Property Office on Oct. 24, 2006 and assigned Serial No. 2006-0103260, the contents of which are incorporated herein by reference.

BACKGROUND OF THE INVENTION

1. Field of the Invention

The present invention relates generally to a wireless communication system and, more particularly, to an operating mode transition method and control apparatus for power saving of a mobile station in a wireless communication environment.

2. Description of the Related Art

Reduction of power consumption in a mobile station is of paramount importance for mobility support in a wireless communication environment.

To reduce power consumption in a mobile station, sleep mode or idle mode operations have been introduced between a mobile station and base station.

In a sleep mode or an idle mode, a mobile station does not perform active operations such as data transmission or data reception. Instead, a real-time clock and phase locked loop are driven, and periodically the mobile station wakes up to scan neighbor base stations or to perform a ranging or handover procedure.

However, in the current specification for broadband wireless access systems, the sleep mode and the idle mode are described separately, and transitions between the idle, sleep and normal modes are not described in detail. According to the specification, a mobile station in the idle mode must wake up to perform signaling operations with the corresponding base station, resulting in unnecessary power consumption of the mobile station. Further, rapid movement of the mobile station in the idle mode may cause frequent idle mode handover, and repeated performance of a ranging procedure may be necessary for network re-entry or location update, thereby consuming more power of the mobile station.

SUMMARY OF THE INVENTION

The present invention has been made in view of the above problems, and an object of the present invention is to provide a method and apparatus that reduce power consumption of a mobile station in a wireless communication environment.

An object of the present invention is to provide a method and apparatus that support a low power mode of a mobile station in a wireless communication environment.

An object of the present invention is to provide a power saving method for a mobile station in a wireless communication environment, by controlling the mobile station to perform a ranging procedure after an idle-to-sleep mode transition.

In accordance with the present invention, there is provided an operating mode transition method for power saving of a mobile station in a wireless communication environment, including performing, in response to reception of a broadcast paging message having an indication of ranging from a corresponding base station during an idle mode, signaling operations for transition to a sleep mode, and performing a ranging procedure in the sleep mode.

In accordance with the present invention, there is provided an operating mode transition method for a mobile station in a wireless communication environment, including receiving, in an idle mode, a control message having an indication of ranging from a corresponding base station, transitioning, upon reception of the control message, to a sleep mode, and performing a ranging procedure in the sleep mode.

In accordance with the present invention, there is provided an operating mode transition method for power saving of a mobile station in a wireless communication environment, including receiving, in an idle mode, a broadcast paging message having an indication of ranging from a corresponding base station, transmitting, upon reception of the broadcast paging message, a sleep request message to the base station, transitioning, upon reception of a sleep response message in reply to the sleep request message, to a sleep mode, and performing a ranging procedure in the sleep mode.

In accordance with the present invention, there is provided an operating mode control apparatus for power saving of a mobile station in a wireless communication environment, including a transceiving unit for message transmission and reception to and from a corresponding base station, and a mode controller for transitioning, upon reception of a control message having an indication of ranging during an idle mode, to a sleep mode, and for controlling performance of a ranging procedure on the basis of the control message.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Hereinafter, preferred embodiments of the present invention are described in detail with reference to the accompanying drawings. The same reference symbols identify the same or corresponding elements in the drawings. Detailed descriptions of constructions or processes known in the art may be omitted for the sake of clarity and conciseness.

The meaning of specific terms or words used in the specification and the claims should not be limited to the literal or commonly employed sense, but should be construed in accordance with the spirit of the invention. The description of the various embodiments is to be construed as preferred only and does not describe every possible instance of the invention. Therefore, it should be understood that various changes may be made and equivalents may be substituted for elements of the invention.

In the present invention, a mobile station may have three operational modes in relation to a corresponding base station: normal mode, idle mode, and sleep mode.

In the normal mode, a mobile station transmits and receives data to and from a base station. Data transfer may be performed after resource allocation and session establishment through a network entry or network re-entry procedure.

The idle mode is for enabling a mobile station to conserve power and operational resources by restricting activities of the mobile station. The idle mode may be initiated after exchange of a De-REGistration REQuest (DREG-REQ) message and De-REGistration CoMmanD (DREG-CMD) message between the mobile station and base station. In the idle mode, the mobile station operates according to paging information such as a paging group, paging cycle and paging offset.

The sleep mode is for reducing power usage of a mobile station and decreasing air interface resource usage of a serving base station. The idle mode may be initiated after exchange of a SLeeP REQuest (MOB_SLP-REQ) message and SLeeP ReSPonse (MOB_SLP-RSP) message between the mobile station and base station. In the sleep mode, the mobile station operates according to a sequence of a sleep window and listening window.

The present invention relates to reduction of power consumption of a mobile station due to frequent idle mode handover caused by rapid movement of the mobile station. Necessary network re-entry or location update is performed after an idle-to-sleep mode transition. In the sleep mode, the mobile station is associated with the power saving class type III, which is recommended for management operations and multicast connections.

In the idle mode, a mobile station wakes up at each paging cycle and receives a broadcast paging (MOB_PAG-ADV) message from a base station during a paging interval. The format of a MOB_PAG-ADV message is illustrated in Table 1.

As shown in Table 1, the MOB_PAG-ADV message includes information elements such as a paging group to which the base station belongs, a Medium Access Control (MAC) address hash indicating a target mobile station to receive this MOB_PAG-ADV message, and an action code indicating a procedure to be performed by the target mobile station.

After reception of a MOB_PAG-ADV message, the mobile station analyzes the received MOB_PAG-ADV message to decide whether to stay in the idle mode, perform a network entry procedure or perform a ranging procedure for location update.

TABLE 1

| Syntax | Size | Notes |
|---|---|---|
| MOB_PAG-ADV_Message_format( ) { | — | — |
|   Management Message Type=62 | 8 bits | — |
|   Num_Paging_Group_IDs | 16 bits | Number of Paging Group IDs in this message |
|   For (i=0: i<Num_Paging_Group_IDs: i++) { | — | — |
|     Paging Group ID | 16 bits | — |
|   } | — | — |
|   Num_MACs | 8 bits | Number of MS MAC addresses |
|   For (j=0: j<Num_MACs: j++) { | — | — |
|     MS MAC Address hash | 24 bits | The hash is obtained by computing a CRC24 on the MS 48-bit MAC address. The polynomial for the calculation is 0x1864CFB |
|     Action Code | 2 bits | Paging action instruction to MS 0b00=No Action Required 0b01=Perform Ranging to establish location and acknowledge message 0b10=Enter Network 0b11=Reserved |
|     Reserved | 6 bits | — |
|   } | — | — |
|   padding | variable | Padding bits to ensure octet aligned |
|   TLV Encoded Information | variable | TLV specific |
| } | — | — |

If the decision is made to perform a network entry procedure or a ranging procedure, the mobile station makes a transition to the sleep mode by transmitting a SLeeP REQuest (MOB_SLP-REQ) message to the base station and by, in return, receiving a SLeeP ReSPonse (MOB_SLP-RSP) message from the base station. Thereby, management operations such as network entry and location update are performed in the sleep mode of the power saving class type III to lengthen the sleep window, thereby reducing power consumption of the mobile station.

TABLE 2

| Syntax | Size | Notes |
|---|---|---|
| MOB_SLP-REQ_Message_format( ) { | — | — |
|   Management message type = 50 | 8 bits | — |

TABLE 2-continued

| Syntax | Size | Notes |
|---|---|---|
| Number of Classes | 8 bits | Number of power saving classes |
| for (i=0: i<Number of Classes: i—-) { | — | — |
|   Definition | 1 bit | — |
|   Operation | 1 bit | — |
|   Power_Saving_Class_ID | 6 bits | — |
|   if (Operation = 1) { | — | — |
|     Start_frame_number | 6 bits | — |
|     Reserved | 2 bits | — |
|   } | — | — |
|   if (Definition = 1) { | — | — |
|     Power_Saving_Class_Type | 2 bits | — |
|     Direction | 2 bits | — |
|     Traffic_triggered_wakening_flag | 1 bit | — |
|     Reserved | 3 bits | — |
|     initial-sleep window | 8 bits | — |
|     listening-window | 8 bits | — |
|     final-sleep window base | 10 bits | — |
|     final-sleep window exponent | 3 bits | — |
|     Number_of_Sleep_CIDs | 3 bits | — |
|     for (i=0; i<Number_of_Sleep_CIDs: i—- { | — | — |
|       CID | 16 bits | — |
|     } | — | — |
|   } | — | — |
| } | — | — |
| TLV encoded information | variable | — |
| } | — | — |

The MOB_SLP-REQ message is to be transmitted by a mobile station to a corresponding base station to initiate a sleep mode. The format of a MOB_SLP-REQ message is illustrated in Table 2.

TABLE 3A

| Syntax | Size | Notes |
|---|---|---|
| MOB_SLP_RSP_Message_format0 { | — | — |
|   Management message type = 51 | 8 bits | — |
|   Number of Classes | 8 bits | Number of power saving classes. |
|   for(i = 0; I < Number_of_Classes; i++) { | — | — |
|     Length of Data | 7 bits | — |
|     Sleep Approved | 1 bit | — |
|     Definition | 1 bit | — |
|     Operation | 1 bit | — |
|     Power_Saving_Class_ID | 6 bits | — |
|     if(Sleep Approved == 1){ | — | — |
|       if(Operation == 1) { | — | — |
|         Start_frame_number | 6 bits | — |
|         Reserved | 2 bits | — |
|       } | — | — |
|       if(Definition = 1) { | — | — |
|         Power_Saving_Class_Type | 2 bits | — |
|         Direction | 2 bits | — |
|         initial-sleep window | 8 bits | — |
|         listening window | 8 bits | — |
|         final-sleep window base | 10 bits | — |
|         final-sleep window exponent | 3 bits | — |
|         TRF-IND required | 1 bit | — |
|         Traffic_triggered_wakening_flag | 1 bit | — |
|         Reserved | 1 bit | — |
|         if (TRF_IND required) { | — | — |
|           SLPID | 10 bits | — |
|           Reserved | 2 bits | — |
|         } | — | — |
|         Number_of_CIDs | 4 bits | — |
|         for (=0; i < Number_of_CIDs;i++) { | — | — |

As shown in Table 2, the MOB_SLP-REQ message includes information elements necessary for initiation of a sleep mode, such as a power saving class parameter, listening window and sleep window parameters.

TABLE 3B

| Syntax | Size | Notes |
|---|---|---|
|         CID | 16 bits | — |
|       } | — | — |
|       if(MDHO or FBSS capability enabled) | — | If MDHO or FBSS capability is enabled in the REG-REQ/RSP message exchange. |
|       { | — | — |
|       Maintain Diversity Set and Anchor BS | 1 bit | — |
|       if (Maintain Diversity Set and Anchor Bs) { | — | — |
|         MDHO/FBSS duration (s) | 3 bits | — |
|       } | — | — |
|     } | — | — |
|     Padding | variable | If needed for alignment to byte boundary |
|     If(Operation = 1) { | — | — |
|       Power Saving Class TLV encoded information | variable | — |
|     } | — | — |
|     } else { | — | In case Sleep Approved == 0 |
|       REQ-duration | 8 bits | — |
|     } | — | — |
|     TLV encoded information | variable | — |
| } | — | — |

The MOB_SLP-RSP message is s transmitted, in reply to a MOB_SLP-REQ message, by the base station to the mobile station to indicate acceptance or rejection of the sleep mode request. The MOB_SLP-RSP message may be transmitted as an unsolicited command message. The format of a MOB_SLP-RSP message is illustrated in Tables 3A and 3B.

As shown in Tables 3A and 3B, the MOB_SLP-RSP message includes information elements necessary for initiation of a sleep mode, such as a sleep request approval parameter, a power saving class parameter, listening window and sleep window parameters.

Figure 1A:
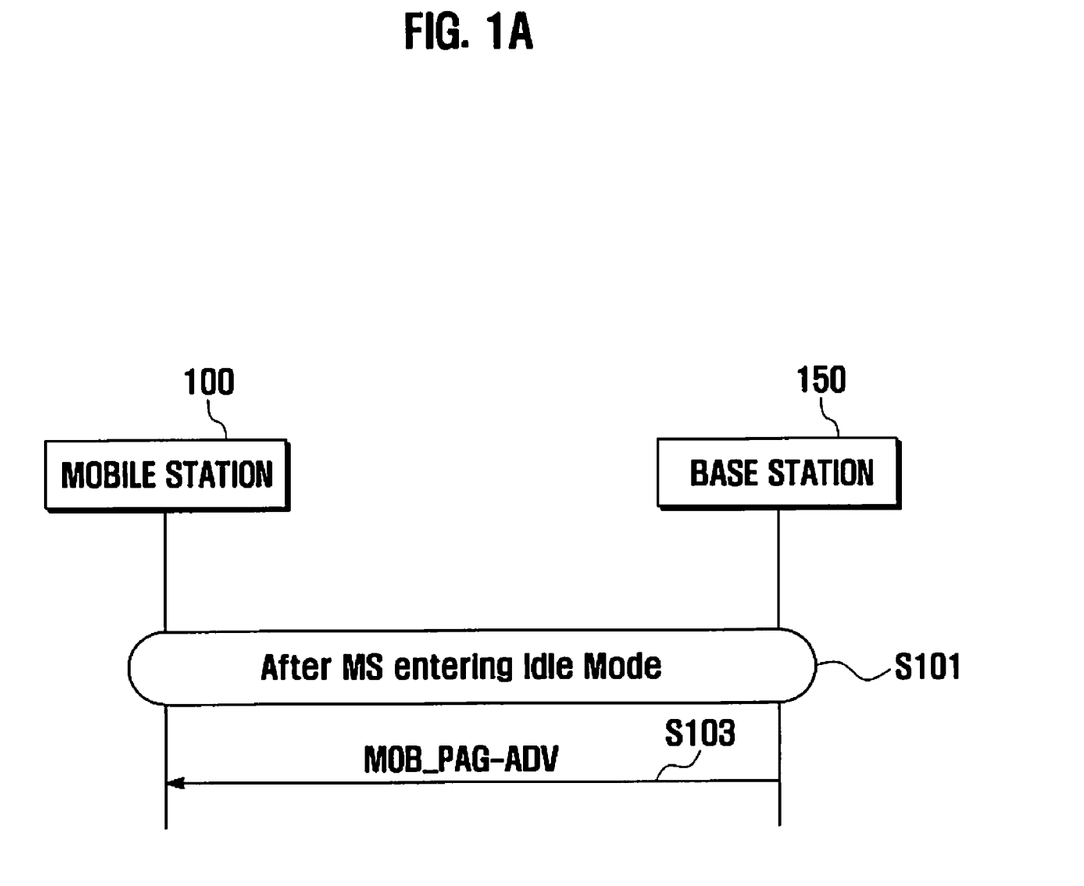
FIGS. 1A and 1B illustrate idle mode operations between a mobile station and a base station to which the present invention is applied.
Figure 1B:
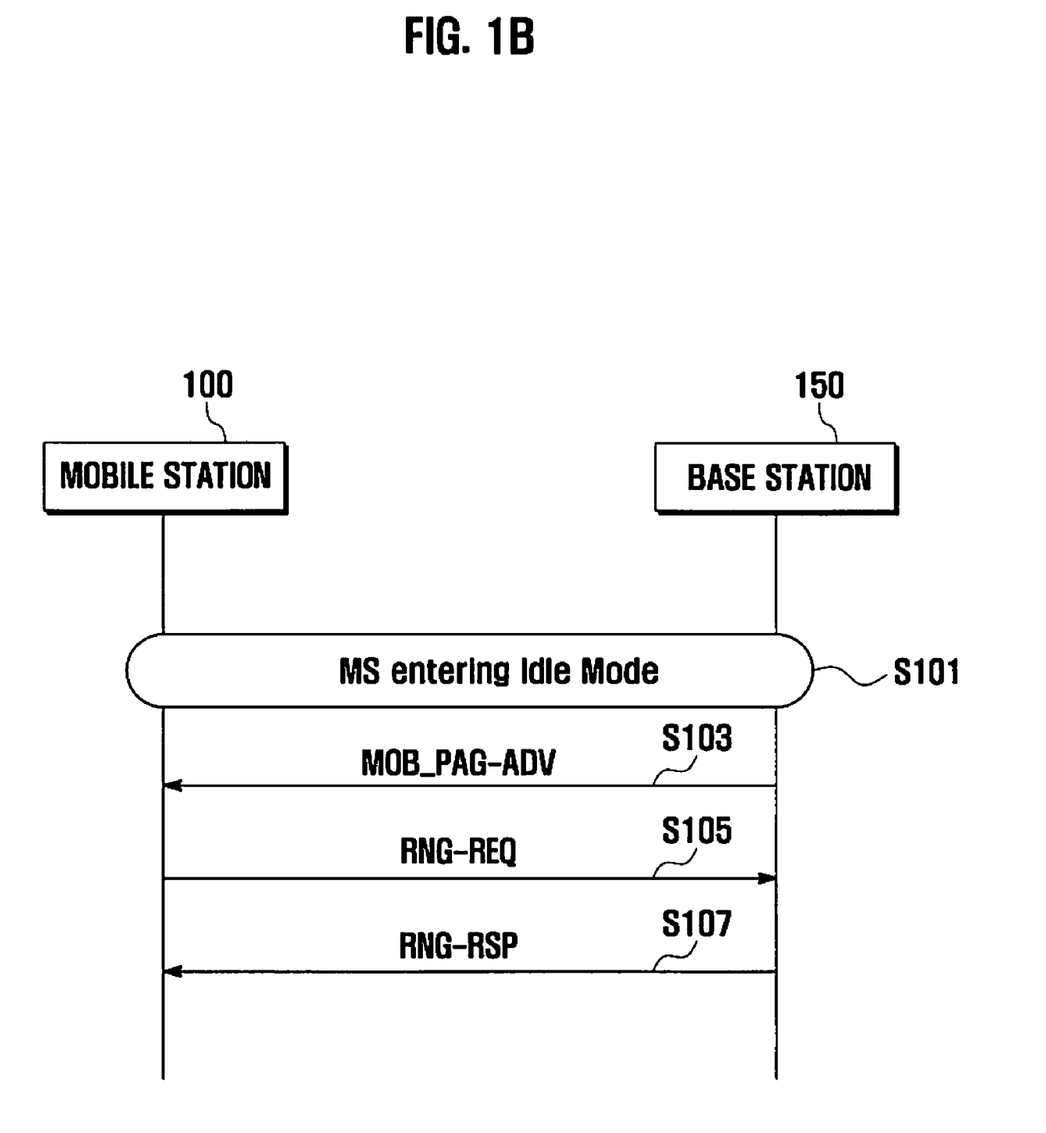

FIGS. 1A and 1B illustrating idle mode operations between a mobile station 100 and a base station 150 to which the present invention is applied.

Referring to FIG. 1A, to reduce power consumption, the mobile station 100 makes a transition to an idle mode (S101). At step S101, to initiate the idle mode, the mobile station 100 transmits a DREG-REQ message containing a paging cycle parameter to the base station 150. In return, the base station 150 transmits a DREG-CMD message containing paging information such as paging group, paging cycle and paging offset parameters. Thereafter, the mobile station 100 in the idle mode operates on the basis of the paging information.

During the idle mode, the mobile station 100 periodically receives a MOB_PAG-ADV message broadcast by the base station 150 (S103). If the action code in a received MOB_PAG-ADV message indicates 'perform ranging' or 'enter network', or when a change in paging group is detected, the mobile station 100 performs ranging for network re-entry or idle mode location update, as illustrated in FIG. 1B. Otherwise, the mobile station 100 does not respond to the received MOB_PAG-ADV message. A change in paging group can be detected by comparing the paging group identifiers in successive MOB_PAG-ADV messages.

Referring to FIG. 1B, continued from FIG. 1A, if ranging is determined to be necessary at step S103, the mobile station 100 transmits a RaNGing REQuest (RNG-REQ) message for network re-entry or idle mode location update to the base station 150 (S105). The RNG-REQ message includes information indicating network re-entry or idle mode location update depending upon the determination at step S103. The base station 150 transmits a RaNGing ReSPonse (RNG-RSP) message back to the mobile station 100 (S107). The RNG-RSP message may include information regarding network re-entry or idle mode location update. Thereafter, the mobile station 100 performs a network re-entry procedure and makes a transition to the normal mode for data reception, or performs a location update procedure in the idle mode.

Figure 2:
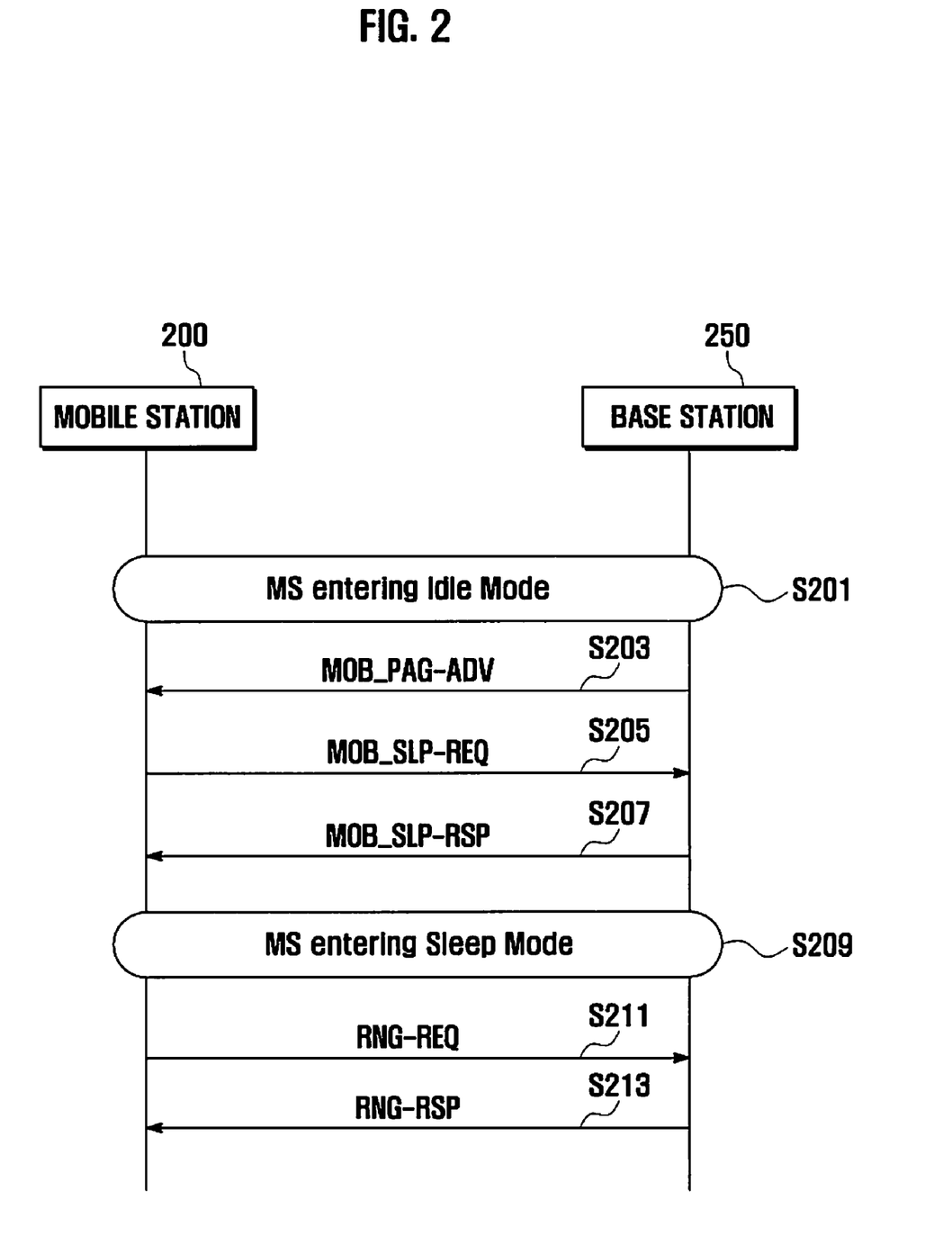
FIG. 2 illustrates ranging related operations between a mobile station and a base station according to the present invention.

FIG. 2 illustrates ranging related operations between a mobile station 200 and a base station 250 according to the present invention.

Referring to FIG. 2, the mobile station 200 is assumed to be in the idle mode at step S201 through operations described in connection with FIG. 1A.

The mobile station 200 in the idle mode periodically receives a MOB_PAG-ADV message broadcast by the base station 250 (S203). If a received MOB_PAG-ADV message has an indication of ranging for network re-entry or location update, the mobile station 200 transmits a MOB_SLP-REQ message to the base station 250 for transition to the sleep mode (S205).

The base station 250 transmits a MOB_SLP-RSP message back to the mobile station 200 (S207). The MOB_SLP-RSP message includes an indication of accepting or rejecting the sleep mode request, and information elements necessary for the sleep mode if accepted. For the purpose of description, the sleep mode request is assumed to be accepted.

Upon reception of the MOB_LP-RSP message, the mobile station 200 makes a transition to the sleep mode (S209).

The mobile station 200 in the sleep mode transmits a RNG-REQ message to the base station 250 (S211). The RNG-REQ message includes an indication of network re-entry or location update depending upon the MOB_PAG-ADV message received at step S203. The base station 250 transmits a RNG-RSP message back to the mobile station 100 (S213). The RNG-RSP message includes information necessary for network re-entry or location update.

Thereafter, the mobile station 100 performs a network re-entry procedure, makes a transition to the normal mode, receives pending data, and then makes a transition back to the idle mode or performs a location update procedure in the sleep mode and makes a transition back to the idle mode (not shown).

Figure 3:
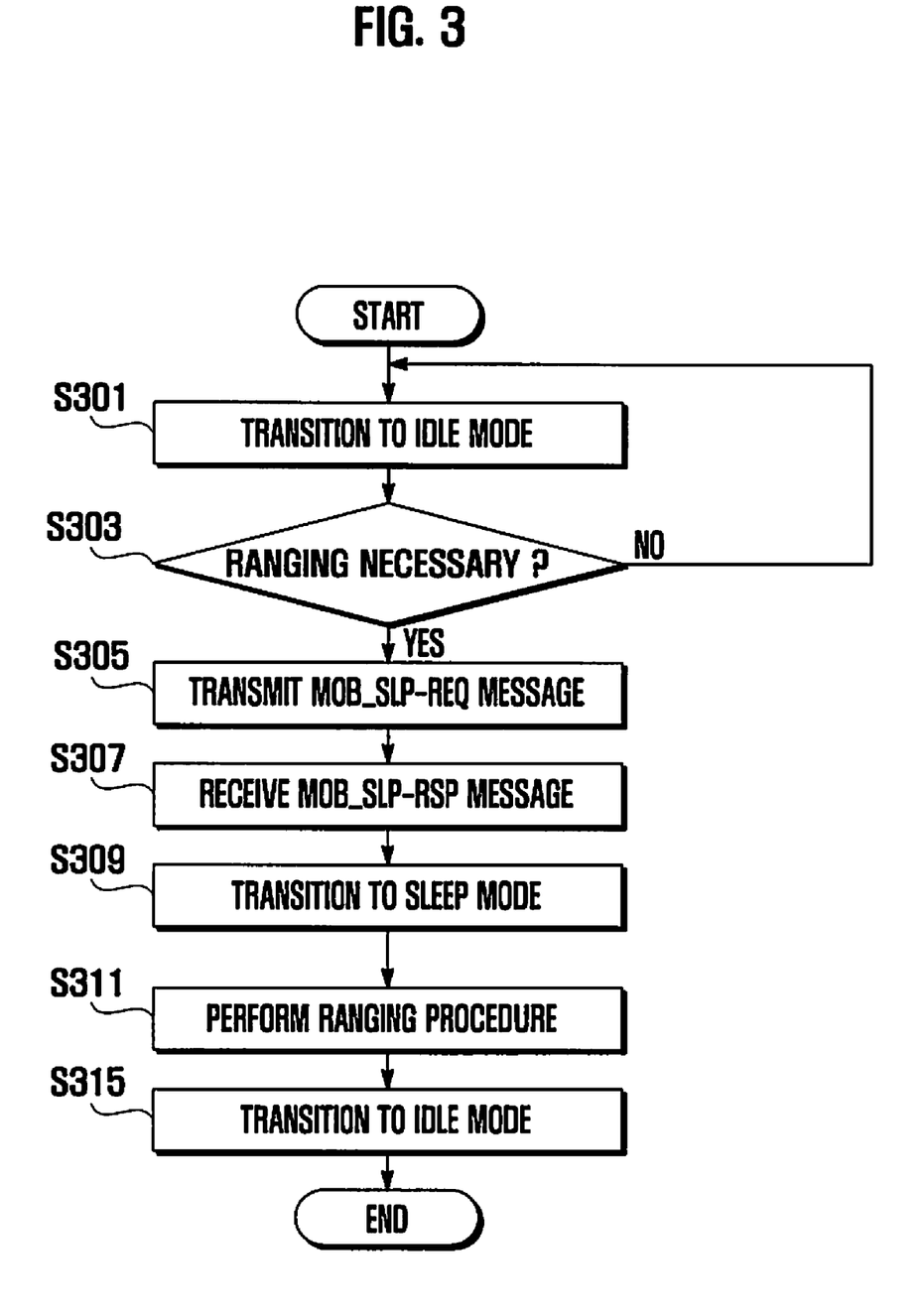
FIG. 3 illustrates an operating mode transition method for power saving in a mobile station corresponding to the operations of FIG. 2.

FIG. 3 illustrates an operating mode transition method for power saving in a mobile station corresponding to the operations of FIG. 2.

Referring to FIG. 3, a mobile station operates in an idle mode (S301). The mobile station in the idle mode periodically receives a MOB_PAG-ADV message broadcast by a base station (S303). If a received MOB_PAG-ADV message requires ranging for network re-entry or location update, the mobile station transmits a MOB_SLP-REQ message to the base station for transition to a sleep mode (S305). The base station transmits a MOB_SLP-RSP message back to the mobile station (S307). If the MOB_SLP-RSP message includes an indication of accepting the sleep mode request, the base station makes a transition to the sleep mode (S309). In the sleep mode, the mobile station performs a ranging procedure for network re-entry or location update (S311), determined according to the received MOB_PAG-ADV message. After ranging, the mobile station makes a transition back to the idle mode (S315).

Figure 4:
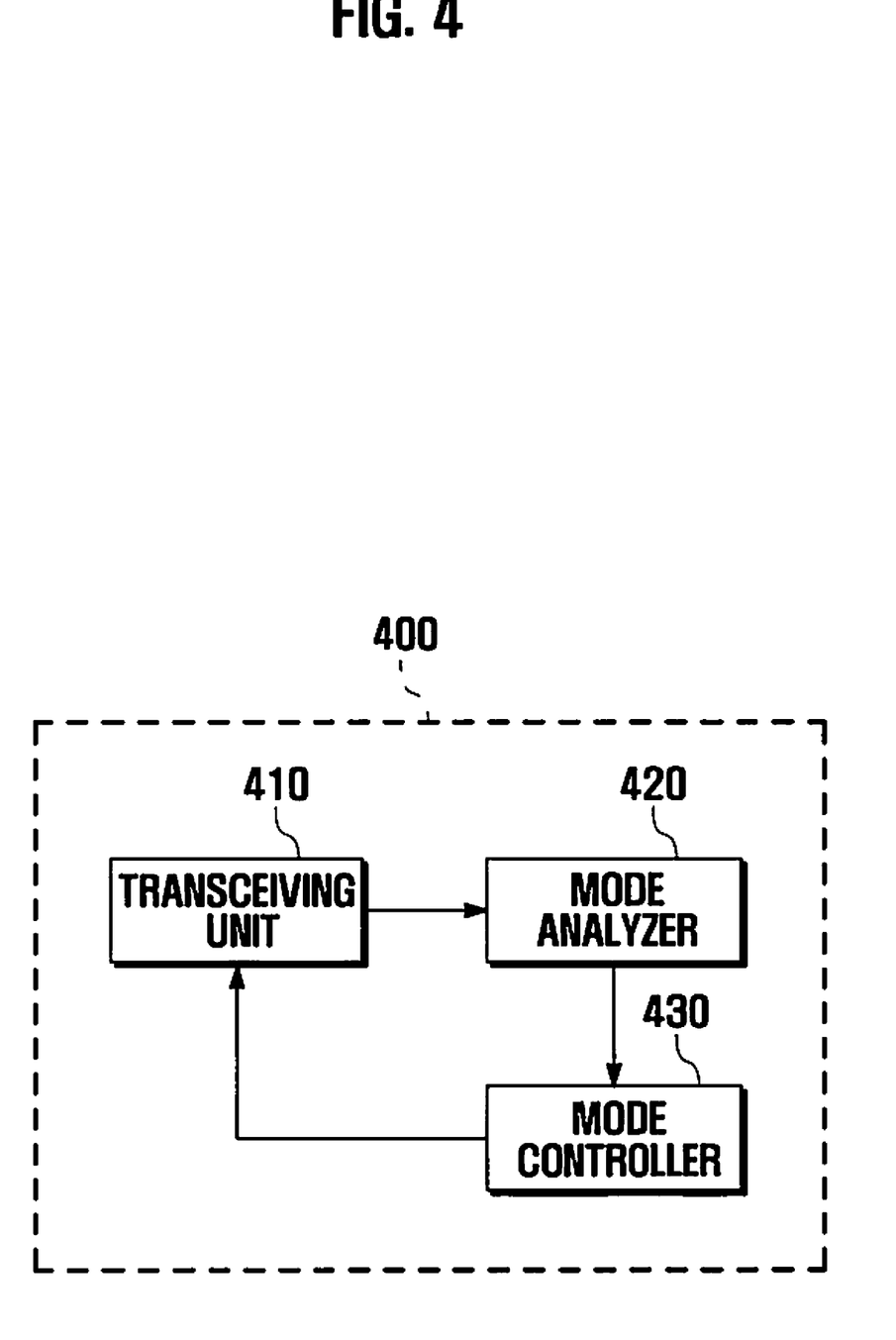
FIG. 4 illustrates a configuration of an operating mode control apparatus for a mobile station according to the present invention.

FIG. 4 illustrates a configuration of an operating mode control apparatus for a mobile station according to the present invention.

Referring to FIG. 4, the operating mode control apparatus 400 includes a transceiving unit 410, mode analyzer 420 and mode controller 430.

The transceiving unit 410 transmits and receives a signaling message to and from a corresponding base station, and forwards a received signaling message to the mode analyzer 420.

The mode analyzer 420 identifies the current operating mode of the mobile station, analyzes a signaling message received via the transceiving unit 410 and determines necessity of an operating mode transition.

The mode controller 430 controls the operating mode of the mobile station using operating mode information collected by the mode analyzer 420. For example, the mode controller 430 makes a transition from an idle mode to a sleep mode, or from the sleep mode to the idle mode, using operating mode information from the mode analyzer 420.

A description on operations of a mobile station having an operating mode control apparatus 400 is provided as follows.

When a MOB_PAG-ADV message is received, the mode analyzer 420 analyzes the MOB_PAG-ADV message. If the MOB_PAG-ADV message requires ranging for network re-entry or location update, the mode analyzer 420 sends the analysis result to the mode controller 430. The mode controller 430 transmits a MOB_SLP-REQ message to a corresponding base station through the transceiving unit 410 for transition to a sleep mode. When a MOB_SLP-RSP message is received in reply to the MOB_SLP-REQ message, the mode analyzer 420 analyzes the MOB_SLP-RSP message and sends the analysis result to the mode controller 430, which then makes a transition to the sleep mode.

In the sleep mode, the mode controller 430 performs a ranging procedure for network re-entry or location update. After completion of the ranging procedure, the mode controller 430 makes a transition back to the idle mode.

Accordingly, the mobile station performs management operations related to network re-entry and location update in the sleep mode of the power saving class type III, thereby reducing power consumption.

As apparent from the above description, the present invention provides an operating mode transition method and control apparatus for power saving of a mobile station in a wireless communication environment. Management operations related to network re-entry and location update are performed in the sleep mode to reduce power consumption.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. An operating mode transition method for power saving of a mobile station in a wireless communication environment, comprising:

performing signaling operations for transition of the mobile station from an idle mode to a sleep mode in a mode controller of the mobile station, in response to a broadcast paging message, which indicates ranging is required for network re-entry or a location update, received from a base station at the mobile station while in the idle mode;

performing a ranging procedure for network re-entry or the location update in the mode controller of the mobile station while the mobile station is in the sleep mode; and transitioning from the sleep mode to the idle mode, after performing the ranging procedure in the sleep mode.

2. The operating mode transition method of claim 1, wherein the performing signaling operations step further comprises:

transmitting a sleep request message to the base station; and transitioning to the sleep mode, after reception of a sleep response message from the base station in reply to the sleep request message.

3. An operating mode transition method for a mobile station in a wireless communication environment, comprising:

receiving a control message from a corresponding base station at a transceiving unit of the mobile station while in an idle mode;

transitioning the mobile station from the idle mode to a sleep mode at a mode controller of the mobile station in response to reception of the control message, when the control message indicates ranging is required for network re-entry or a location update;

performing a ranging procedure for network re-entry or the location update in the mode controller of the mobile station while the mobile station is in the sleep mode;

transitioning the mobile station from the sleep mode to the idle mode, after performing the ranging procedure in the sleep mode.

4. The operating mode transition method of claim 3, wherein the control message is a broadcast paging message.

5. The operating mode transition method of claim 4, wherein the broadcast paging message includes necessary information for the ranging procedure in the sleep mode.

6. An operating mode transition method for power saving of a mobile station in a wireless communication environment, comprising:

receiving, at a transceiving unit of the mobile station in an idle mode, a broadcast paging message from a corresponding base station;

transmitting a sleep request message from the transceiving unit of the mobile station to the base station in response to reception of the broadcast paging message, when the broadcast paging message indicates that ranging is required for network re-entry or a location update;

transitioning from the idle mode to a sleep mode at a mode controller of the mobile station, upon reception of a sleep response message at the transceiving unit of the mobile station in reply to the sleep request message;

performing a ranging procedure for network re-entry or the location update in the mode controller of the mobile station while the mobile station is in the sleep mode; and transitioning from the sleep mode to the idle mode, after performing the ranging procedure in the sleep mode.

7. An operating mode control apparatus for power saving of a mobile station in a wireless communication environment, comprising:

a transceiving unit for message transmission and reception to and from a corresponding base station; and a mode controller for transitioning from an idle mode to a sleep mode, in response to reception of a control message, which indicates that ranging is required for network re-entry or a location update, while in the idle mode, for controlling performance of a ranging procedure for network re-entry or the location update while in the sleep mode on the basis of the control message, and for transitioning from the sleep mode to the idle mode after performing the ranging procedure in the sleep mode.

8. The operating mode control apparatus of claim 7, further comprising a mode analyzer for analyzing a control message received via the transceiving unit to identify a current operating mode and necessity of a mode transition.

9. The operating mode control apparatus of claim 7, wherein the control message is a broadcast paging message (MOB_PAG-ADV message).

10. The operating mode control apparatus of claim 9, wherein the broadcast paging message includes necessary information for the ranging procedure in the sleep mode.

* * * * *